Nov. 15, 1927. 1,649,044
T. H. THOMAS
LOAD BRAKE DEVICE
Filed Jan. 6, 1926
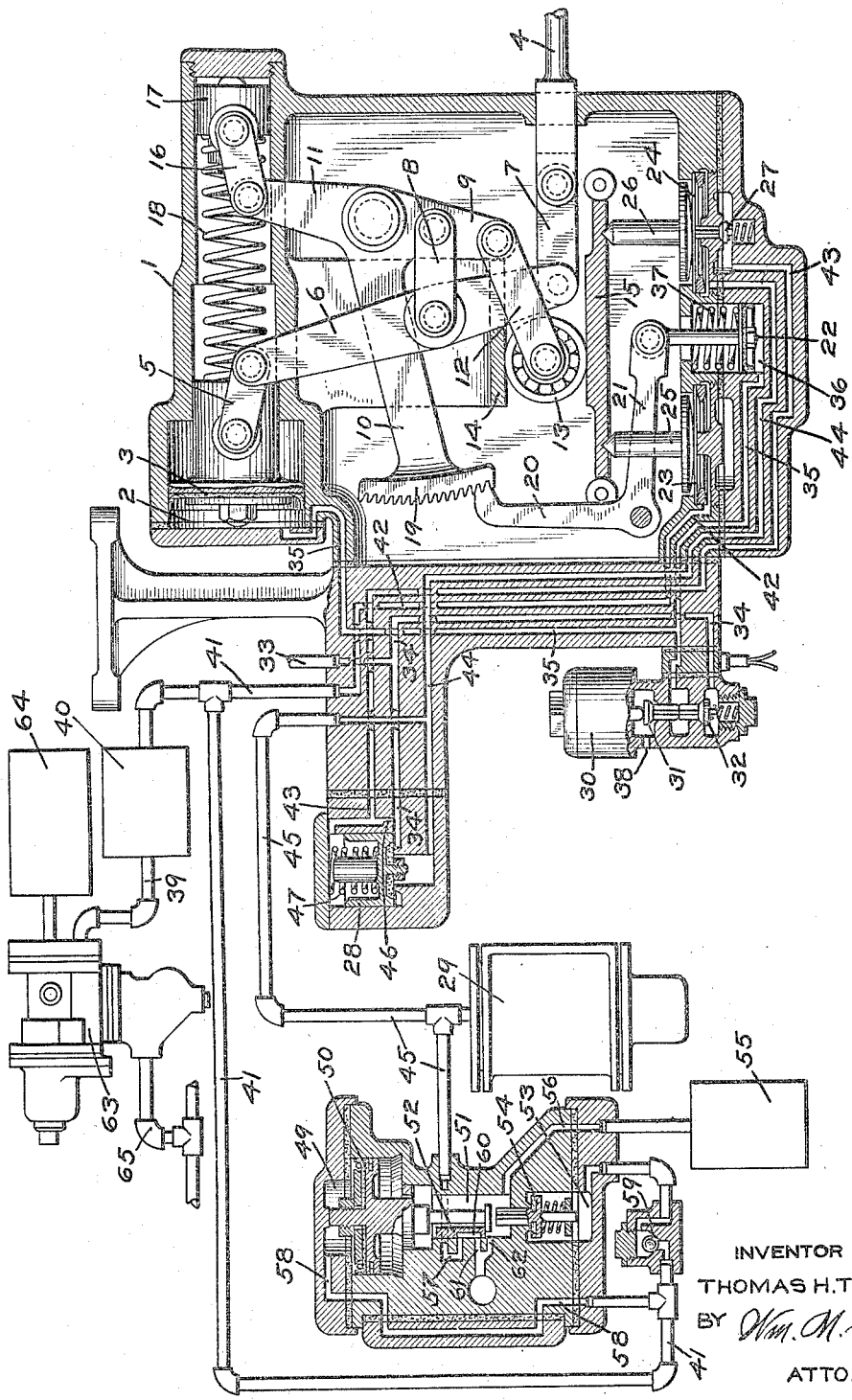
INVENTOR
THOMAS H. THOMAS
BY Wm. M. Cady
ATTORNEY Patented Nov. 15, 1927.

1,649,044

UNITED STATES PATENT OFFICE.

THOMAS H. THOMAS, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA.

LOAD BRAKE DEVICE.

Application filed January 6, 1926. Serial No. 79,549.

This invention relates to a variable load fluid pressure brake, in which the braking power is automatically varied according to the load on the car.

The principal object of my invention is to provide means in connection with a variable load brake apparatus for reducing the brake cylinder pressure proportionately to the load on the car when a graduated release of the brakes is effected.

In the accompanying drawing, the single figure is a diagrammatic view, mainly in section, of a variable load brake apparatus, showing my invention applied thereto.

The variable load brake apparatus shown in the drawing to which my invention is applied, is similar to that covered by a prior pending application of C. C. Farmer, Serial No. 10,456, filed February 20, 1925, and comprises a casing 1 having a piston chamber 2, containing a piston 3, the operation of which is adapted to cut the load regulated apparatus into operation. For this purpose, the piston 3 is operatively connected to a rod 4 through links 5, a lever 6, and links 7. The rod 4 is adapted to operate a movable member (not shown) which contacts with a member (not shown) carried by the car truck, so that movements of the car body due to variations in load on the car, relative to the car truck, will be transmitted through said rod to the load regulated mechanism.

The lever 6 is connected by links 8 with an arm 9 of a member having additional arms 10 and 11, and the arm 9 is also connected through links 12 to a fulcrum roller 13 which bears at one side against a fixed plate 14 and at the opposite side against a movable plate 15. The arm 11 is connected through links 16 with a movable head 17 which is subject to the pressure of a coil spring 18 interposed between said head and the piston 3.

The arm 10 is provided at its end with a toothed segment 19, the teeth of which are engageable by a toothed arm 20 of a bell crank lever, the other arm 21 of which is connected to an operating piston 22.

Disposed below the plate 15 at opposite sides of the fulcrum roller 13 are flexible diaphragms 23 and 24 having pins 25 and 26 which connect said diaphragms to the plate 15. The diaphragm 24 is also adapted to control the operation of a valve 27.

The variable load brake apparatus also includes a valve piston 28 which acts as a relay valve for controlling the supply of fluid under pressure to the brake cylinder 29, and a magnet valve device, the magnet 30 of which is controlled by the opening and closing of the car doors. Said magnet is adapted to operate double beat valves 31 and 32.

The operation of the variable load brake apparatus will now be described, after which the construction and functioning of my invention will be explained. When the car is brought to a stop and the car doors are opened, the magnet 30 will be energized, causing the valve 31 to be seated and the valve 32 to be unseated, so that fluid under pressure is supplied from a source of fluid under pressure, such as the usual main reservoir, to piston chamber 2, through pipe 33, passage 34, past the open valve 32 to passage 35, which leads to piston chamber 2. Passage 35 also leads to piston chamber 36 containing the piston 22. The spring 37 acting on piston 22 is such that the piston 3 will be moved by fluid supplied to piston chamber 2 before the piston 22 is moved against the resistance of spring 37 and consequently the piston 3 will first move with the links 8 acting as a fulcrum for the lever 6, since the links are held against movement by the locking of the arm 10 and consequently the arm 9, through the engagement of the teeth of the pawl arm 20 with the teeth of the toothed segment 19. As the piston 3 moves, the lever 6 is rocked about its pivotal connection to the links 8 and thereby the rod 4 is pulled toward the left to effect an operative connection such that movement of the car body relative to the car truck by variations in load on the car will be transmitted through the rod 4 to the load regulated mechanism, as full described in the patent application of C. C. Farmer, hereinbefore referred to.

After the above described operation has taken place, the fluid pressure in chamber 36 will build up to a point at which the piston 22 will move so as to operate the arms 21 and 20 and cause the teeth of the arm 20 to be released from the teeth of the toothed segment 19, thus allowing the free movement of the connected arms 10, 11, and 9.

The fulcrum roller 13 will be positioned according to the load on the car, and if the load is increased, the rod 4 will be moved toward the right. The links 5 now act as a fulcrum for the lever 6, and said lever will be moved toward the right by the rod 4 and this movement will be transmitted through the links 8, the lever 9, and the links 12 to the fulcrum roller 13, moving said roller toward the right.

When the car doors are closed, the magnet 30 will be deenergized, causing the valve 32 to be seated and the valve 31 unseated, so that fluid under pressure is released from the piston chambers 2 and 36 by way of exhaust port 38. The greater pressure of spring 37 causes the movement of piston 22 before the piston 3 is moved by spring 18, so that the pawl arm 20 is first operated to engage the toothed segment 19 and lock the arm 10 against movement and consequently the fulcrum roller 13 is held in its adjusted movement, according to the load on the car.

When the brakes are applied, fluid under pressure is supplied from a triple valve device 63, or other brake controlling valve device, through pipe 39 to a dummy brake cylinder 40, and fluid from the dummy brake cylinder is supplied through pipe 41 and passage 42 to the chamber below the diaphragm 23. The diaphragm 23 and the pin 25 are then moved upwardly, causing the plate 15 to be tilted about the fulcrum roller 13, so that a downward movement is transmitted to the pin 26 and the diaphragm 24. The downward movement of the diaphragm 24 causes the opening of valve 27, so that the spring side of valve piston 28 is connected to the brake cylinder 29 by way of passage 43, past the open valve 27, passage 44 and pipe 45. Fluid under pressure from the supply pipe 33 and passage 34 acts on the outer seated area of said valve piston, so that the venting of fluid from the spring chamber of the valve piston by the opening of valve 27, faster than fluid can flow through the restricted port 46 to maintain the pressure, causes the upward movement of said valve piston, and when the valve piston is unseated, fluid under pressure is supplied from the passage 34 to passage 44 and consequently to the brake cylinder 29. The pressure of fluid supplied to the brake cylinder acts through passage 44 on the under face of the diaphragm 24 and when the brake cylinder pressure has been increased so as to overcome the pressure supplied to the dummy brake cylinder 40 and acting on the under face of diaphragm 23, and dependent upon the position of the fulcrum roller 13, the diaphragm 23 will be forced downwardly, permitting the upward movement of the diaphragm 24 and the closing of valve 27.

With the venting of valve 27, fluid under pressure equalizes through port 46 to the spring chamber of the valve piston 28, permitting the spring 47 to shift said valve piston to its seat, thus cutting off the further flow of fluid to the brake cylinder.

As above described, the apparatus so far referred to operates to apply the brakes at a pressure corresponding with the load on the car, and now I will describe the construction and operation of my invention, by which the brakes may be gradually released in proportion to the load on the car. For this purpose, a valve device is provided comprising a casing having a piston chamber 49 containing a piston 50, a valve chamber 51 containing a slide valve 52 adapted to be operated by said piston, and a valve chamber 53, in line with valve chamber 51, and containing a poppet valve 54, also adapted to be operated by the piston 50.

A volume reservoir 55 is connected through passage 56 with the valve chamber 51 and brake cylinder pipe 45 is connected to passage 57, leading to the seat of slide valve 52. The piston chamber 49 is connected by a passage 58 with the dummy brake cylinder pipe 41 and said pipe also communicates with valve chamber 53, past a check valve 59.

In operation, when the brakes are applied, fluid under pressure is supplied to the dummy brake cylinder 40 and flows through pipe 41 and passage 58 to piston chamber 49. The piston 50 is then shifted downwardly, moving the slide valve 52 to cut off communication from the brake cylinder 29, through cavity 60 in slide valve 52, to exhaust port 61. The movement of piston 50 also operates to unseat the valve 54, so that fluid under pressure will flow from pipe 41, past the check valve 59 to valve chamber 53 and thence past the unseated valve 54 to valve chamber 51, charging said chamber and the volume reservoir 55 at the pressure of the dummy brake cylinder 40.

If a partial or gradual reduction in pressure in the dummy brake cylinder 40 is effected in order to graduate the release of the brakes, the pressure in piston chamber 49 will be correspondingly reduced, while the pressure in the valve chamber 53 will be prevented from reducing by the check valve 59. The higher pressure in the valve chamber 51 then causes the piston 50 to be shifted upwardly, so that the slide valve 52 is moved to release position, in which cavity 60 connects passage 59 with exhaust port 61. Fluid under pressure is then released from the brake cylinder 29.

In the release position of slide valve 52, an exhaust port 62 is opened to the valve chamber 51, so that fluid under pressure in valve chamber 51 and in the reservoir 55 blows down through the atmospheric exhaust and when the pressure in the valve chamber 51 has been reduced to a degree slightly less than the pressure acting on the piston 50 in piston chamber 49, said piston will be moved so as to close the exhaust from the brake cylinder and from the valve chamber 51, thus preventing the further exhaust of fluid from the brake cylinder 29.

The brake cylinder and volume reservoir exhaust ports 61 and 62 are so proportioned with respect to the reservoir volume, that the brake cylinder pressure will be reduced at a rate proportional to the amount the pressure in the dummy brake cylinder 40 is reduced.

With my improvement applied, it will be seen that the pressure in the brake cylinder will be reduced on each car of the train to an extent dependent upon the amount the pressure in the dummy brake cylinder is reduced, and this holds true on cars lightly loaded as well as on heavily loaded cars.

Having now described my invention, what I claim as new and desire to secure by Letters Patent, is:—

1. In a variable load brake, the combination with a main brake cylinder, of a chamber into which fluid under pressure is supplied in applying the brakes, means operated according to the pressure in said chamber and according to the load on the car for controlling the supply of fluid under pressure to the brake cylinder, and a valve device operated upon a reduction in pressure in said chamber for releasing fluid under pressure from the brake cylinder.

2. In a variable load brake, the combination with a main brake cylinder, of a dummy brake cylinder into which fluid under pressure is supplied in applying the brakes, means governed by the pressure in the dummy brake cylinder for supplying fluid under pressure to the main brake cylinder in proportion to the load on the car, a valve for controlling the release of fluid from the main brake cylinder, and a piston subjected on opposite sides to the pressure of fluid supplied to the dummy brake cylinder and operated upon a reduction in pressure in the dummy brake cylinder for actuating said valve to release fluid from the main brake cylinder.

3. In a variable load brake, the combination with a main brake cylinder, of a dummy brake cylinder into which fluid under pressure is supplied in applying the brakes, means governed by the pressure in the dummy brake cylinder for supplying fluid under pressure to the main brake cylinder in proportion to the load on the car, a movable abutment, the opposite sides of which are subjected to the pressure of fluid in said dummy brake cylinder, a check valve for preventing back flow from one side of said abutment to the dummy brake cylinder, and a valve operated by said abutment for controlling the release of fluid under pressure from the main brake cylinder.

4. In a variable load brake, the combination with a main brake cylinder, of a dummy brake cylinder into which fluid under pressure is supplied in applying the brakes, means governed by the pressure in the dummy brake cylinder for supplying fluid under pressure to the main brake cylinder in proportion to the load on the car, a movable abutment having the chamber at one side in connection with said dummy brake cylinder, a valve operated by said abutment for controlling the release of fluid under pressure from the main brake cylinder, and a valve operated by the movement of said abutment for opening communication from the dummy brake cylinder to the opposite side of said abutment.

5. In a variable load brake, the combination with a main brake cylinder, of a dummy brake cylinder into which fluid under pressure is supplied in applying the brakes, means governed by the pressure in the dummy brake cylinder for supplying fluid under pressure to the main brake cylinder in proportion to the load on the car, a movable abutment having the chamber at one side in communication with said dummy brake cylinder, a valve operated by said abutment for controlling the release of fluid under pressure from the main brake cylinder, a valve operable by the movement of said abutment for opening communication from the dummy brake cylinder to the opposite side of said abutment, and a check valve for preventing back flow from said opposite side of the abutment to the dummy brake cylinder.

6. In a variable load brake, the combination with a main brake cylinder, of a dummy brake cylinder into which fluid under pressure is supplied in applying the brakes, means governed by the pressure in the dummy brake cylinder for controlling the supply of fluid to the main brake cylinder according to the load on the car, and a valve device subjected on opposite sides to the pressure of fluid in the dummy brake cylinder and operated upon a reduction in pressure in the dummy brake cylinder on one side for releasing fluid from the main brake cylinder and for venting fluid from the opposite side of said valve device.

7. In a variable load brake, the combination with a main brake cylinder, of a dummy brake cylinder into which fluid under pressure is supplied in applying the brakes, means governed by the pressure in the dummy brake cylinder for controlling the supply of fluid to the main brake cylinder according to the load on the car, a movable abutment subjected on opposite sides to the pressure of fluid in the dummy brake cylinder, and means operated by said abutment upon a reduction in pressure on one side thereof for releasing fluid from the main brake cylinder and from the opposite side of said abutment.

8. In a variable load brake, the combination with a main brake cylinder, of a dummy brake cylinder into which fluid under pressure is supplied in applying the brakes, means governed by the pressure in the dummy brake cylinder for controlling the supply of fluid to the main brake cylinder according to the load on the car, a movable abutment having a chamber at one side communicating with the dummy brake cylinder, means for supplying fluid from the dummy brake cylinder to a chamber at the opposite side of said abutment, a volume reservoir connected to the chamber at said opposite side of the abutment, and a valve operated by said abutment upon a reduction in pressure in the dummy brake cylinder for releasing fluid from the main brake cylinder and from said volume reservoir.

9. In a variable load brake, the combination with a main brake cylinder, of a dummy brake cylinder into which fluid under pressure is supplied in applying the brakes, means governed by the pressure in the dummy brake cylinder for controlling the supply of fluid to the main brake cylinder according to the load on the car, a piston having a piston chamber at one side communicating with the dummy brake cylinder, a valve operated by said piston upon an increase in pressure in the dummy brake cylinder for opening communication from the dummy brake cylinder to the chamber at the opposite side of said piston, and a valve operated by said piston upon a reduction in pressure in the dummy brake cylinder for releasing fluid from the main brake cylinder and for venting fluid from the chamber at said opposite side of the piston.

In testimony whereof I have hereunto set my hand.

THOMAS H. THOMAS.